(No Model.)  3 Sheets—Sheet 1.
F. G. RILEY.
CORKING MACHINE.
No. 279,813.  Patented June 19, 1883.
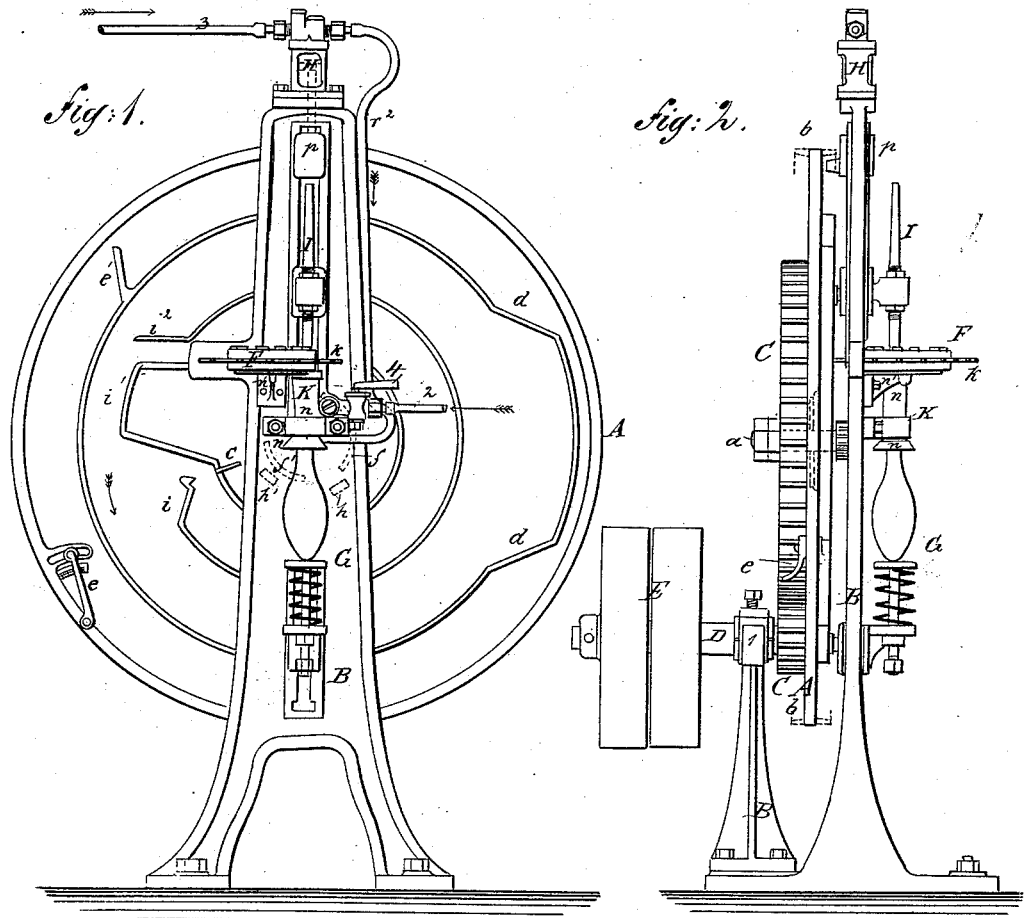
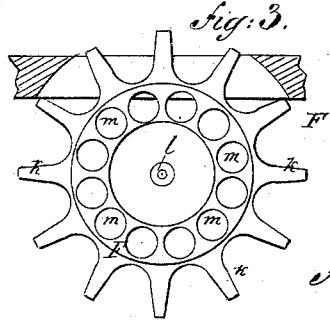
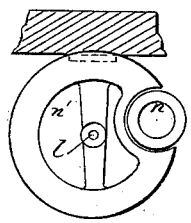
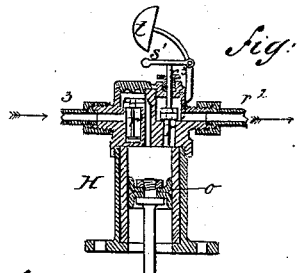
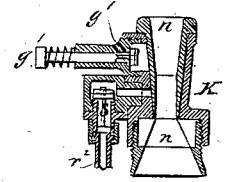
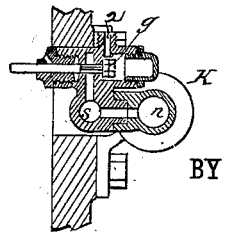
WITNESSES:  INVENTOR:
F. G. Riley
BY
ATTORNEYS.

(No Model.)  3 Sheets—Sheet 2.

F. G. RILEY.
CORKING MACHINE.

No. 279,813.  Patented June 19, 1883.

WITNESSES:
Chas. Nidd.
C. Sedgwick

INVENTOR:
F. G. Riley
BY Munn & Co.
ATTORNEYS.

(No Model.)  3 Sheets—Sheet 3.

F. G. RILEY.
CORKING MACHINE.

No. 279,813. Patented June 19, 1883.

WITNESSES:
Chas. Nida
C. Sedgwick

INVENTOR:
F. G. Riley
BY Munn & Co.
ATTORNEYS.

UNITED STATES PATENT OFFICE.

FREDERIC GEORGE RILEY, OF LONDON, ENGLAND.

CORKING-MACHINE.

SPECIFICATION forming part of Letters Patent No. 279,813, dated June 19, 1883.

Application filed May 23, 1882. (No model.) Patented in England February 7, 1881, No. 524.

*To all whom it may concern:*

Be it known that I, FREDERIC GEORGE RILEY, of the city of London, England, have invented a new and useful Improvement in Apparatus for Filling and Corking or Stoppering Bottles, of which the following is a full, clear, and exact description.

My invention relates to apparatus by means of which the entire series of operations requisite for the filling and corking or stoppering of bottles may be performed automatically, each bottle being carried through the several operations before another is brought within the range of the apparatus to be operated upon.

The invention is applicable both to bottles for non-aerated liquids closed by means of corks, and for bottles for aerated liquids closed with either corks or self-closing stoppers.

In my improved machine all the motions necessary for working the different parts are obtained from a rotary disk, wheel, or pulley which is mounted upon a horizontal shaft or axis in the main frame of the machine, and is driven either by hand or by a belt passing around its periphery, or by toothed gearing, the said disk, wheel, or pulley carrying cams for operating the several parts. When a sirup-pump is used, as in the case of aerated liquids, I combine therewith a device which will give an audible signal to warn the attendant when the delivery-valve is not working properly, all as hereinafter described and claimed.

Reference is to be had to the accompanying drawings, forming part of this specification, in which similar letters of reference indicate coresponding parts in all the figures.

Figure 8:
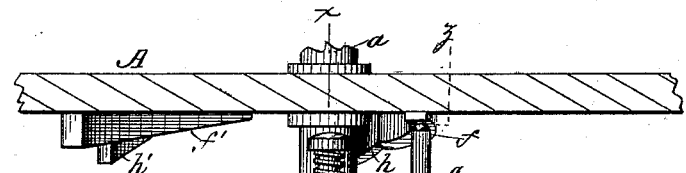
Figure 9:
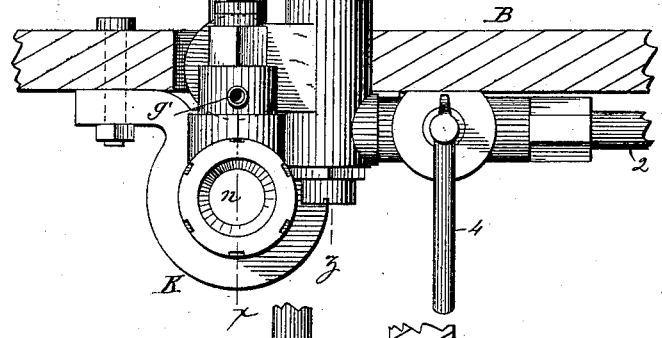
Figure 10:
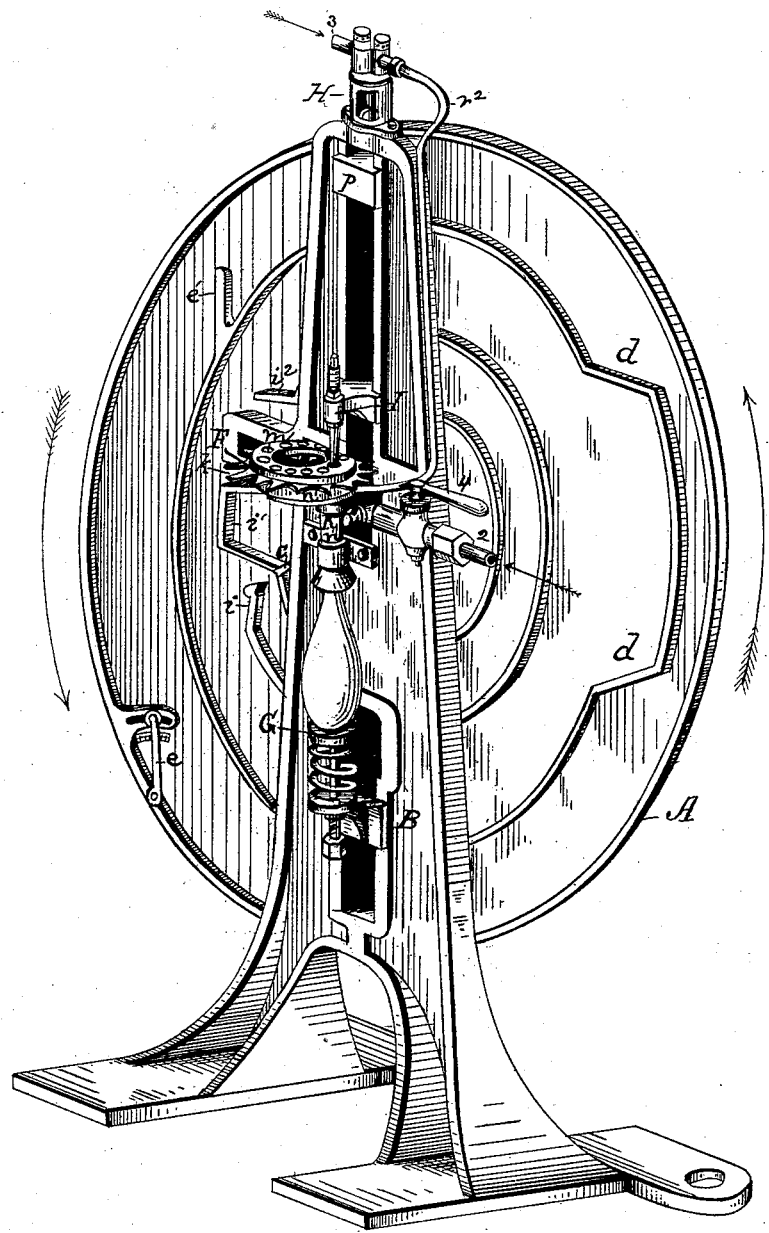

Figure 1 is a front elevation, and Fig. 2 is a side elevation, of the machine. Figs. 3 and 4 are detail sectional plan views of the cork-feeding device. Fig. 5 is a vertical section of the sirup-pump. Fig. 6 is a detail vertical section, and Fig. 7 is a detail horizontal section, of parts of the valve mechanism and cork-compressing apparatus, taken on lines $x\ x$ and $y\ y$, respectively, of Figs. 8 and 9. Fig. 8 is a plan view, and Fig. 9 is a side elevation in section on line $z\ z$ of Fig. 8, of parts of the valve mechanism and cork-compressing apparatus, showing the disk A and frame B in section and partly broken away. Fig. 10 is a perspective view of the entire machine.

A is a rotary disk, wheel, or pulley mounted upon a horizontal shaft, $a$, supported in a suitable bearing in the frame B of the machine, and may be driven either by hand or mechanical power. When mechanical power is used the wheel A may receive its motion through intervention of toothed gearing C on the main shaft D, which is supported in a bearing, 1, in the frame B, and is drawn by a belt and pulley, E, from any suitable prime mover; or the disk, wheel, or pulley may be formed with a flange at its periphery, as shown by dotted lines at $b$ in Fig. 2, and be driven directly by means of a belt passing around the said peripheral flange.

The disk or wheel A carries cams for working the several parts as follows: first, a cam, $c$, operating a device, F, for supplying the corks one by one to the machine; second, the cams $d\ d$, operating a movable stand, G, for carrying the bottles; third, the cams $e\ e'$ for operating a sirup-pump, H; fourth, the cams $f\ f'$, operating a valve, $g$, for inlet of the aerated liquid, and cams $h\ h'$, operating a valve, $g'$, for the escape of air; fifth, the cams $i\ i'\ i^2$, operating on an appliance, I, for compressing the corks and forcing the same into the bottles. These parts are all arranged and operated in the manner next described.

The device F, for supplying the corks to the machine, consists of a frame, to which an intermittent rotating motion is imparted by means of the cam $c$ on the disk or wheel A acting on arms or projections $k$ upon the said frame, the latter being provided around its axis $l$ with a series of apertures, $m$, for the corks to be brought one by one above the funnel $n$ of the filling and compressing apparatus K and caused to fall into or enter the said funnel. The axis $l$ is supported in a step-bearing in a fixed platform, $n'$, on which the corks rest until they are discharged one by one into the funnel $n$.

The stand G, for carrying the bottles, is fitted for a vertical rising and falling motion in a slot or mortise of the main frame B, such motion being effected and controlled by means of the cams $d\ d$ on the disk, wheel, or pulley A, the said stand being raised in order to force the mouth of the bottle in contact with the funnel $n$, in readiness for the operation of filling and corking, and then lowered again after those operations are completed.

The sirup-pump H is carried on the main frame B, and its plunger $o$ is actuated by means of a vertical slide, $p$, fitted for movement in the frame B and operated by cams $e\ e'$ on the disk, wheel, or pulley A, the cam $e$, which imparts the downstroke, being made adjustable in an angular direction, as shown in Fig. 1, so that the quantity of sirup admitted may be varied as required, while the cam $e'$ in all cases returns the plunger to its normal position. 3 is the inlet-pipe for the sirup.

$r$, Fig. 5, is the inlet-valve of the pump, and $r'$ is the delivery-valve.

The valve $g$, for the inlet of the aerated liquid, is operated by means of the two cams $f\ f'$, (see Fig. 8,) and the valve $g'$, for the escape of air, is operated by means of two other cams, $h\ h'$, all carried upon the disk, wheel, or pulley A, and suitably timed and arranged to admit of the respective valves $g\ g'$ being opened at the requisite times, maintained open for sufficient periods, and closed at the requisite times.

The appliance I, for compressing the corks and forcing the same into bottles, consists of a plunger fitted for movement upon the main frame, and operated by cams $i\ i'\ i^2$, carried upon the disk, wheel, or pulley A, and so timed and arranged as to cause a cork delivered into the funnel end to be first compressed under the action of the cam $i^2$, and then, after the bottle is filled, to be forced into the same under the action of the cam $i$, the pressing and driving plunger being then withdrawn under the action of the cam $i'$, in readiness for the reception of another cork.

In operating the machine the cork-feeder F is supplied with the requisite number of corks to fill the series of apertures $m$ in the feeder, and, the machine being set in motion, the bottle is placed by hand on the movable stand G, beneath the filling and corking funnel $n$, when the said stand is in its lowest position. Let it be assumed that the disk, wheel, or pulley A is in such a position that the cam $d$ is about to operate so as to lift the movable stand G. The cork will then be situate in the funnel $n$ by the feeder F having been previously operated by the cam $c$, and the barrel of the sirup-pump will be full of sirup by the plunger $o$ having performed its downstroke under the action of the cam $e$ upon the slide $p$. The cam $d$ then operates, raising the movable stand G so that the mouth of the bottle placed thereon is forced into contact with the under side of the funnel $n$. The compressing and driving plunger I performs a portion of its downstroke under the action of the cam $i^2$ for compressing the cork, and the plunger $o$ of the sirup-pump H performs its upstroke under the action of the cam $e'$, thus forcing the supply of sirup through the valve $r'$, pipe $r^2$, valve $s$, and funnel $n$ into the bottle. The main portion of the aerated liquid is next introduced through the pipe 2 by cock 4, and through the valve $g$, provided for its admission, and operated by a cam, $f$, and the air-valve $g'$ is opened under the action of the cam $h$ for the escape of air, so as to admit of the bottle being completely filled, and the valve $g$ being again opened under the action of the cam $f'$, after which the air is again exhausted through the valve $g'$, operated by the cam $h'$. The compressing and driving plunger then completes its downward stroke under the action of the cam $i$, thus forcing the cork into the bottle, and gradually rises to the full extent of its upstroke under the action of the cam $i'$, and the movable stand G, carrying the filled and corked bottle, descends by gravity as allowed by the cam $d$. During the completion of the last-mentioned series of operations the plunger $o$ of the sirup-pump H will have again received its downstroke by the action of the cam $e$ upon the slide $p$, thus taking a fresh supply of the sirup. On the raising of the compressing and driving plunger I to a sufficient extent the cork-feeder F is again operated by the cam $c$, thus bringing another cork within the range of the operating apparatus, and the series of actions hereinbefore described are then repeated, and so on in succession during the operation of the machine.

In lieu of introducing bottles into the machine and removing them therefrom by hand, they may be delivered into and from the machine automatically by the employment of a skeleton frame operated by a cam on the disk, wheel, or pulley A in a similar manner to the cork-feeder, and having its openings arranged for the reception of a number of bottles, the bottoms of which pass through the openings and rest upon a platform beneath, the bottles being introduced one by one into the movable stand G, beneath the filling and corking funnel $n$, and delivered therefrom one by one at the requisite period.

In order to afford an indication that the sirup-pump H is performing its duties or otherwise, I provide the spindle $r^3$ of the delivering-valve $r'$ (which is suitably prolonged) with a striker or hammer, $s'$, so arranged, in connection with a bell or gong, $t$, that when the valve is open to its fullest the bell or gong $t$ shall be sounded, the failure of this audible signal being an indication of the non-action of the valve.

In applying the invention to the filling and corking of bottles with non-aerated liquids the sirup-pump is dispensed with, the other parts practically remaining unaltered. In a case of filling bottles for aerated liquids closed by internal stoppers the apparatus is constructed, generally, in the manner hereinbefore described; but the bottles are arranged to be operated upon in an inverse position, and an air-rod is substituted for the compressing and driving plunger, the cork-feeder and air-valve being obviously dispensed with.

Having thus fully described my invention, what I claim as new, and desire to secure by Letters Patent, is—

1. The combination of the disk, wheel, or pulley A, provided with the cam $c$, cams $d\ d$, cams $e\ e'$, cams $f\ f'$ and $h\ h'$, and the cams $i\ i'\ i^2$, with the cork-supplying device F, movable stand G, sirup-pump H, cork compressing and forcing appliance I, funnel n, sirup-valve s, air-valve g', and supply-valve g, substantially as shown and described, for operation successively as set forth.

2. The combination of the movable stand G, adapted for vertical movement in a stationary frame, the funnel n, and the vertical rotary wheel or disk A, provided with cam d, for raising the stand, substantially as described.

3. The combination of the movable bottle-stand G, the funnel n, provided with valves g g', and the rotary disk or wheel A, provided with the cams d f f' and h h', substantially as shown and described.

4. The combination of the movable bottle-stand G, the funnel n, provided with valves g g' s, the sirup-pump H, and the rotary disk or wheel A, provided with cams for giving motion to the several parts in succession, substantially as shown and described.

5. The combination of the movable bottle-stand G, the funnel n, provided with suitable valves for inlet of the liquid, the cork-supplying device F, cork compressing and forcing appliance I, and the rotary disk or wheel A, provided with cams for giving the required movement to the parts in succession, substantially as shown and described.

6. The cork-supplying device F, consisting of a frame having a series of apertures, m, in combination with the funnel n, provided with inlet-valves for the liquid, and the rotary disk or wheel A, provided with cams for giving an intermittent movement to the cork-holder and to the valves in the funnel, substantially as shown and described.

7. The appliance I, consisting of a plunger operated intermittently by a rotary cam, disk, or wheel, in combination with the cork-supplying device F, substantially as shown and described.

8. The funnel n, provided with valve g', for the inlet of the liquid, sirup-valve s, and air-escape valve g, substantially as shown and described.

The foregoing specification of my improvements in corking-machines signed by me this 25th day of April, 1882.

FREDERIC GEORGE RILEY.

Witnesses:
EMILY HARRIET FISHER,
FRANCES RILEY.